3,311,491
METHOD OF COATING POLYOLEFINES WITH VINYLIDENE CHLORIDE COPOLYMERS
Alfred Reichardt, Ludwigshafen (Rhine), Hans Reinhard, Limburgerhof, Pfalz, and Heinz-Wilhelm Leifels, Ludwigshafen (Rhine), Germany, assignors to Badische Anilin- & Soda-Fabrik Aktiengesellschaft, Ludwigshafen (Rhine), Germany
No Drawing. Filed Nov. 25, 1964, Ser. No. 413,968
Claims priority, application Germany, Nov. 30, 1963, B 74,471; May 2, 1964, B 76,627
7 Claims. (Cl. 117—47)

This invention relates to a method of coating polyolefine molded articles wtih vinylidene chloride copolymers using special emulsion copolymers for the production of an adhesion promoting subcoating.

Polyolefine sheeting and other polyolefine molded articles and polyolefine composite materials are used widely for water vapor impermeable packagings capable of being printed and heat sealed. The polyolefine sheeting and composite materials are welded into bags, sacks, other containers and other packagings. The strength of such packagings depends on the type and amount of the materials used and the quality of the welding seam. Polyolefine sheeting and polyolefine composite materials are not so suitable for some packaging purposes because they are not sufficiently resistant to oils and fats and they exhibit too high a permeability to gases, such as oxygen, nitrogen and carbon dioxide, to vaporized solvents, such as hydrocarbons and alcohols, and for the aroma substances of many bulk goods, such as coffee and spices.

It is known that the permeability of polyolefine molded articles may be prevented or greatly decreased by coating them with aromaproof, gasproof and greaseproof films, with aqueous plastics dispersions or with lacquers.

Coating, for example, with polyamide films or metal foils is technically expensive and in some cases attended by disadvantages. For coating with plastics dispersions it is usual to use copolymers of vinylidene chloride which are free from plasticizer and which give thermoplastic protective coatings which are capable of being heat sealed. Adhesion of the prior art vinylidene chloride copolymer coatings to the polyolefine molded articles is, however, unsatisfactory. Adhesion may be improved in a conventional way by an oxidising pretreatment or by irradiation of the polyolefine surface. The improvement is however slight. Reactive polyurethanes have therefore already been added to the vinylidene chloride copolymer solutions in coating. According to the U.S. patent specification No. 2,786,783 the surface of the polyethylene is first treated with sulfonating agents and then coated with solutions of copolymers of vinylidene chloride and basic reacting monomers, for example 1-vinylpyridine. It is a disadvantage of this method that expensive solvents have to be used and, in view of the low solids content of the solutions, coatings having the technically interesting application of 5 to 15 g./sq. m. cannot be achieved in a single operation.

From U.S. patent specifications Nos. 2,824,024 and 2,829,068 methods are known according to which pretreated polyethylene films are coated using an adhesion promoter with vinylidene chloride copolymer dispersions which contain at least 80% by weight of vinylidene chloride units. Adhesion promoters are aqueous dispersions of vinylidene chloride copolymers which contain less than 80% by weight of vinylidene chloride or dispersions of elastomers such as polyisobutylene and butadiene polymers. While it is possible to obtain coatings of adequate thickness by this method, the resistance to separation of the welded seam achieved upon welding these composite materials is inadequate in many cases.

We have now found that pretreated sheeting and other molded articles of polyolefines, which may if desired be applied to a substrate, can be advantageously coated with vinylidene chloride copolymers by applying an adhesion promoting polymer of ethylenically unsaturated polymerizable compounds, drying the subcoating and applying an aqueous dispersion of a film-forming copolymer containing more than 80% by weight of vinylidene chloride, by using for the production of the adhesion promoting subcoating an emulsion copolymer of 90 to 98% by weight of at least one monoolefinic monomer selected from the group consisting of copolymerizable ethylenically unsaturated acids having three to five carbon atoms, their esters with alcohols having one to eight carbon atoms, their nitriles, or amides, styrene, vinyl chloride, vinylidene chloride, vinyl esters of monocarboxylic acids having one to eighteen carbon atoms and 2 to 10% by weight of at least one N-alkylolamide of a copolymerizable ethylenically unsaturated acid having three to five carbon atoms.

We have further found that by using the said emulsion copolymers for the subcoating together with 6.5 to 10% of their weight of acid reacting compounds, it is possible surprisingly, to lower the drying temperature for the subcoatings to below 110° C. In this way it is possible to process unsupported films and molded articles of polyolefines, particularly those of polyethylene according to this invention at temperatures at which deformation of the polyolefine molded article by the action of heat during drying is avoided.

Homopolymers and copolymers prepared by conventional high pressure and low pressure polymerization methods from monoolefines having two to five carbon atoms, such as ethylene or propylene, which are processed by conventional methods into films, sheeting and other molded articles, are suitable as polyolefines. In the polyolefine composite materials, polyolefine films or sheeting are applied to the substrates in the usual way, preferably by pressing the hot extruded films or sheeting onto the substrates. The amount of polyolefines applied may be varied within wide limits. Good results have been obtained in the process with a rate of application of 5 to 50 g. of polyolefine per square meter of substrate. The polyolefines generally do not contain any lubricant or antiblocking agent. In special cases, the polyolefines may also contain lubricants and antiblocking agents.

The substrates for the polyolefines may be for example non-woven fabric and fabric of natural and synthetic fibers, particularly paper, cardboard and cotton cloth, and also semisynthetic and synthetic films or sheeting.

In the process according to the invention, the surface of the polyolefine is treated in the conventional ways, for example with oxidising flames, with fuming sulfuric acid, with chromosulfuric acid, by the action of ozone or, preferably, by exposure to corona discharges.

The emulsion copolymer of ethylenically unsaturated polymerizable compounds of which 2 to 20% by weight, preferably 2 to 7% by weight, are N-alkylol carboxylic amides, which is used for the production of the adhesion promoting subcoating, may be prepared by a conventional method.

Particular examples of ethylenically unsaturated polymerizable N-alkylolamide compounds which are suitable for the production of emulsion copolymers are the N-alkylolamides and of these particularly the N-methylolamides of ethylenically unsaturated monocarboxylic and/or dicarboxylic acids having three to five carbon atoms, such as acrylic acid, methacrylic acid, itaconic acid and maleic acid, and also the N-alkylol derivatives of acryloylureas, acryloylurethanes, acryloylmelamines and similar N-alkylol derivatives of polymerizable compounds which contain carboxylic amide, carboxylic imide, ureido, dicyandiamido, carbamic acid, thiocarbamic acid or glyoxaldiureine groupings. N-methylolacrylamide and N-methylolmethacrylamide are preferred monomers.

Examples of unsaturated polymerizable compounds which, in addition to those specified, may be used for the production of the emulsion copolymers, are particularly esters and half-esters of alcohols containing one to eight carbon atoms with ethylenically unsaturated carboxylic acids containing three to five carbon atoms, such as acrylic acid, methacrylic acid, maleic acid, fumaric acid, itaconic acid or mixtures thereof, and also the nitriles of the said acids, such as acrylonitrile and methacrylonitrile, vinyl halides, such as vinyl chloride and vinylidene chloride, vinyl esters of monocarboxylic acids having one to eighteen carbon atoms, such as vinyl acetate and vinyl propionate, styrene, and also in smaller proportions, particularly in amounts of 1 to 20% by weight, polar monomers, such as the amides and hemiamides of the said unsaturated acids, for example acrylamide, methacrylamide, the ethylenically unsaturated carboxylic acids having three to five carbon atoms, such as acrylic acid, methacrylic acid, crotonic acid, maleic acid, fumaric acid, itaconic acid and maleic anhydride. Esters of acrylic acid with alcohols having one to four carbon atoms, such as methyl acrylate, ethyl acrylate, propyl acrylate and the butyl acrylates are particularly suitable. The monomers may be copolymerized alone or mixed with each other together with the ethylenically unsaturated N-alkylol carboxylic amides.

The emulsion polymers are preferably used as aqueous dispersions in the process according to this invention. The dispersions generally contain about 40 to 60% by weight of copolymer. Solutions of the copolymers may however be used instead of dispersions. The dispersions or solutions are applied to the polyolefine surface continuously or batchwise by brushing, spraying, knife coating, rolling or trowelling, and the thickness of the coating may be regulated in known manner.

The amount of emulsion copolymer applied may be varied within wide limits. Application of amounts of from about 1 to about 10 g., preferably 1 to 5 g., of the emulsion copolymers to be used according to this invention per square meter of surface have proved to be well suited.

The subcoating of emulsion polymer is dried in the usual way. At the conventional drying temperatures of 90° to 110° C. or 100° to 150° C. (depending on whether polyolefine composite materials or unsupported polyolefine molded materials, such as sheeting, and whether additives to accelerate curing are used) a thin film is rapidly formed from the emulsion polymer and the moisture substantially removed therefrom.

Acid reacting compounds may be added to the dispersion or solution in amounts of 0.1 to 10% by weight, preferably 1 to 3% by weight, with reference to the emulsion copolymer, prior to or during application of the subcoating, so that the drying temperature may be lowered to below 110° C.

Curing agents conventional in aminoplast chemistry are particularly suitable as acid reacting compounds. Examples are acids or acid-supplying compounds, such as sulfuric acid, phosphoric acid, p-toluenesulfonic acid, formic acid, acetic acid, oxalic acid, acrylic acid, vinylsulfonic acid, and acid reacting salts, such as salts of weak bases with strong acids, for example ammonium phosphate, ammonium oxalate, zinc chloride, zinc nitrate and magnesium chloride.

It is also possible, however, to lower the drying temperature by monomeric units contained in the emulsion copolymer which contain acid groupings or groupings which liberate acid, such as particularly acrylic acid, methacrylic acid, maleic acid, fumaric acid and itaconic acid, and also vinylsulfonic acid or styrene-p-sulfonic acid.

After the adhesion promoting subcoating has dried, the aqueous dispersion of the film-forming vinylidene chloride copolymer is applied in the usual way and dried. Here again the amount applied may be varied within wide limits. It preferably amounts to 5 to 20 g. of vinylidene chloride copolymer per square meter of the surface provided with the adhesive subcoating. The vinylidene chloride copolymer applied should be film-forming and should contain 80 to 97% by weight, preferably 85 to 92% by weight, of vinylidiene chloride units. It is preferred to use vinyl chloride and esters of acrylic acid with alcohols having one to four carbon atoms as comonomers in the production of the vinylidene chloride copolymers. Other ethylenically polymerizable compounds, such as acrylic and methacrylic acid esters of higher aliphatic, cycloaliphatic or aromatic hydroxyl compounds having five to eighteen carbon atoms, styrene, vinyl acetate, vinyl propionate, maleic esters, acrylonitrile, methacrylonitrile, and, in smaller amounts, particularly in amounts of 0.1 to 3% by weight, also polar monomers, such as acrylic acid, methacrylic acid or crotonic acid, or their amides, monoalkylamides or dialkylamides, also maleic acid, fumaric acid, itaconic acid and their hemiamides, N-substituted hemiamides or hemiesters, may however also be used as comonomers.

The products obtained by the process according to this invention may be welded and exhibit an excellent impermeability to oils, greases, aroma substances and gases, such as water vapor and oxygen. They are particularly suitable as packaging material for strongly hygroscopic foodstuffs and condiments containing aroma substances, and also those containing grease or oil and those which are sensitive to oxygen, for example for frozen foods, and also for packaging chemicals.

Whereas coating layers of vinylidene chloride copolymers in the prior art composite materials of this type could usually be pulled off wholly or in strips from the polyolefine surface, the coating layers on films, sheeting and other molded articles prepared according to this invention can only be peeled off or scratched off with difficulty or not at all. Welded seams prepared with the coated polyolefine molded articles or composite materials are furthermore distinguished by a particularly high strength of the welded seam.

The following examples will further illustrate the invention. The welded seam strength given in the following examples have been determined as follows:

(a) Two smooth metallic welding jaws heated to 140° C., between which the composite material is arranged with the applied layers facing each other, are pressed together for half a second under a pressure of 6 kg./sq. cm. The width of the sealing strip is 1 cm. The welded surfaces are cut into strips 38 mm. in width at right angles to the welded seam. After having been conditioned for twenty-four hours at 20° C. and 65% relative humidity, the free ends of the sample strips are clamped in a tensile strength testing machine (Frank, maximum tractive force 5 kg.) and drawn apart at the rate of 12 cm. per minute. The force required to pull the ends apart, measured in kg., serves as a measure of the strength of the welded seam.

In addition:

(b) The strength of the welded seam is determined on the test strips while moist after they have been kept for three weeks as 38° C. and 95% relative humidity.

Finally:

(c) The strength of the welded seam is determined on bags of the composite material, the bags having been kept filled with water at room temperature for two weeks and then strips having a width of 38 mm. having been cut from the welded seams.

The amounts stated in the examples to have been applied are determined by extraction of the composite material with tetrahydrofurane. The parts and percentages given are by weight.

EXAMPLES 1-4

A paper web of 100% unbleached sulfate cellulose having a weight of 60 g./sq. m. is coated by a conventional method with 24 g. per square meter of high pressure polyethylene (density 0.918). The polyethylene surface of the composite web is then exposed at a web speed of 10 meters per minute at 2 amps. and 17 kv. to a corona discharge. A 40% aqueous dispersion of an emulsion polymer of a polymerizable N-methylol carboxylic amide which has been prepared by a conventional method is then applied by means of rollers. The dispersion contains in each case 3% by weight, with reference to the polymer, of a commercial emulsifier.

The compositions of the emulsion copolymer used are as follows:

*Example 1.*—A copolymer of 98 parts of ethyl acrylate and 2 parts of N-methylolacrylamide.

*Example 2.*—A copolymer of 50 parts of styrene, 45 parts of butyl acrylate and 5 parts of N-methylolacrylamide.

*Example 3.*—A copolymer of 95 parts of butyl acrylate and 5 parts of N-methylolacrylamide.

*Example 4.*—A copolymer of 88 parts of butyl acrylate, 7 parts of acrylic acid and 5 parts of N-methylolacrylamide.

The applied coating is levelled with an air brush and excess dispersion thus stripped off. The coating is then dried in a hot air tunnel at 100° to 120° C. The amount of copolymer applied to form the adhesive subcoating is given in the table in g./m.$^2$.

An aqueous dispersion of a copolymer of 90 to 92% by weight of vinylidene chloride and 8 to 10% by weight of methyl acrylate is then applied in the usual way using rollers and an air brush and the layer is dried at 120° to 130° C. The amount of the top coating thus applied is also shown in the table in g./m.$^2$.

The strength of the welded seam, measured as described above under (a), (b) and (c), is given in kg. in the table.

TABLE

| Example | 1 | 2 | 3 | 4 | 5 |
|---|---|---|---|---|---|
| Adhesive subcoating | 2.5 | 5 | 3 | 4 | 5 |
| Top coating | 12 | 14 | 19 | 18 | 10 |
| Strength of welded seam: | | | | | |
| (a) | 2.6 | 4.1 | 3.9 | 4.1 | 2.3 |
| (b) | 3.2 | 4.0 | 3.0 | 3.0 | 2.3 |
| (c) | 2.6 | 3.0 | 2.6 | 2.2 | 2.0 |

For comparison, there are used under otherwise the same conditions:

(1) As the adhesive subcoating, 5 g./m.$^2$ of a copolymer of 55 parts of butadiene and 45 parts of acrylonitrile and as top coating 20 g./m.$^2$ of a copolymer of 90 parts of vinylidene chloride and 10 parts of methyl acrylate and (2) as the adhesive subcoating, 6 g./m.$^2$ of a copolymer of 54 parts of butyl acrylate, 44 parts of vinyl acetate and 2 parts of acrylic acid and, as top coating, 15 g./m.$^2$ of the vinylidene chloride copolymer specified under (1) applied in each case to a paper web coated with polyethylene. Composite materials are obtained which have the following welded seam strengths:

| | (1) | (2) |
|---|---|---|
| (a) | 1.5 | 0.6 |
| (b) | 1.5 | 0.4 |
| (c) | 1.4 | 0.4 |

EXAMPLE 5

Cardboard of 100% bleached sulfite cellulose and having a weight of 170 g. per square meter is coated with 7 g. of polyethylene (density 0.923) per square meter and then provided, as described in Examples 1 to 4, with 5 g./m.$^2$ of an emulsion polymer of 93 parts of butyl acrylate, 3 parts of acrylonitrile, 1 part of acrylic acid and 3 parts of N-methylolmethacrylamide as subcoating and 10 g./m.$^2$ of a copolymer of 90 parts of vinylidene chloride and 10 parts of methyl acrylate as a covering layer. A composite material is obtained which has the following welded seam strengths:

(a)—2.3 kg.
(b)—2.3 kg.
(c)—2.0 kg.

EXAMPLE 6

Cardboard is coated with 40 g. of polyethylene (density 0.918) per square meter and pretreated as described in Examples 1 to 4. A 40% aqueous dispersion of an emulsion copolymer of 50 parts of styrene, 45 parts of butyl acrylate and 5 parts of N-methylolmethacrylamide is then applied to the polyethylene surface with a roll kiss coater with levelling by an air brush. The coating is dried with hot air with additional irradiation with infrared at 100° to 120° C. The amount applied is 2 g. of polymer per square meter. A top coating is then applied, after drying, using an aqueous dispersion of a copolymer of 92 parts of vinylidene chloride and 8 parts of methyl acrylate, the amount applied being 5 g. of polymer per square meter. A composite material is obtained which has an excellent welded seam strength.

EXAMPLE 7

The procedure of Example 6 is followed except that the emulsion copolymer is applied with 2% of formic acid and dried at 100° to 110° C. A composite material is obtained which has a good welded seam strength.

EXAMPLES 8-18

The surface of the polyethylene sheeting is exposed to a corona discharge by a conventional method. A 40% aqueous dispersion of an emulsion copolymer containing a N-methylol carboxylic amide grouping, in which additives having an acid reaction have been incorporated, is then applied by means of rollers. The dispersion contains in each case 3%, with reference to the copolymer, of a commercially available emulsifier.

The following are the compositions (in percent by weight of the copolymer) of the emulsion copolymers and additives having an acid reaction used.

*Example 8.*—A copolymer of 50 parts of styrene, 45 parts of n-butyl acrylate and 5 parts of N-methylolacrylamide; additive 2% of magnesium chloride.

*Example 9.*—A copolymer of 72 parts of n-butyl acrylate, 24 parts of methyl acrylate and 4 parts of N-methylolmethacrylamide; additive 2% of magnesium chloride.

*Example 10.*—A copolymer of 72 parts of n-butyl acrylate, 24 parts of methyl acrylate and 4 parts of N-methylolmethacrylamide; additive 1.5% of zinc chloride.

*Example 11.*—A copolymer of 72 parts of n-butyl acrylate, 24 parts of methyl acrylate and 4 parts of N-methylolmethacrylamide; additive 2% of ammonium chloride.

*Example 12.*—A copolymer of 96 parts of n-butyl acrylate, 1 part of acrylic acid and 3 parts of N-methylolmethacrylamide; additive 2% of magnesium chloride.

*Example 13.*—A copolymer of 88 parts of n-butyl acrylate, 7 parts of acrylic acid and 5 parts of N-methylolacrylamide; additive 1% of formic acid.

*Example 14.*—A copolymer of 95 parts of n-butyl acrylate and 5 parts of N-methylolmethacrylamide; additive 2% of zinc chloride.

*Example 15.*—A copolymer of 95 parts of n-butyl acrylate and 5 parts of N-methylolmethacrylamide; additive 1.5% of oxalic acid.

*Example 16.*—A copolymer of 95 parts of vinyl propionate, 30 parts of n-butyl acrylate, 20 parts of styrene and 5 parts of N-methylolacrylamide; additive 1% of magnesium chloride.

*Example 17.*—A copolymer of 58 parts of n-butyl acrylate, 35 parts of vinyl chloride and 7 parts of N-methylolacrylamide; additive 1% of magnesium chloride.

*Example 18.*—A copolymer of 63 parts of n-butyl acrylate, 30 parts of vinylidene chloride, 2% of acrylamide and 5% of methylolacrylamide; additive 0.5% of formic acid.

Application of the said dispersions is levelled out with an air brush and excess dispersion thus stripped off. The coating is then dried in a hot air tunnel at 90° to 110° C. The amount of copolymer applied is 1 to 5 g./m.$^2$.

An aqueous dispersion of a copolymer of 90 to 92 parts of vinylidene chloride and 8 to 10 parts of methyl acrylate, prepared by a conventional method, is then applied using rollers and an air brush and the top coating is dried at 100° to 110° C.

The welded seam strengths of the composite materials prepared according to Examples 8 to 18 are between 0.5 and 1 kg./cm.

We claim:
1. In a method of manufacturing coated articles from articles having a polyolefin surface by
    (A) pretreating the polyolefin surface to improve the adhesion characteristics thereof,
    (B) applying a subcoating to the pretreated polyolefin surface, drying said subcoating, and
    (C) applying as a top coating to the subcoating an aqueous dispersion of a copolymer of 80 to 97% by weight of vinylidene chloride and 3 to 20% by weight of another copolymerizable monomer and drying said top coating, the improvement of applying as subcoating an emulsion polymer of
        (a) 90–98% by weight of a member selected from the group consisting of (1) at least one ester of an ethylenically unsaturated carboxylic acid having 3–5 carbon atoms and an alcohol having 1–8 carbon atoms and (2) at least one of said esters plus at least one other copolymerizable ethylenically unsaturated monomer selected from the group consisting of ethylenically unsaturated nitriles having 3–5 carbon atoms, ethylenically unsaturated carboxylic acids having 3–5 carbon atoms, amides of said carboxylic acids, styrene, vinyl chloride, vinylidene chloride, vinyl esters of saturated monocarboxylic acids having 1–18 carbon atoms, and
        (b) 2 to 10% by weight of at least one N-alkylolamide of a copolymerizable ethylenically unsaturated acid having 3 to 5 carbon atoms.

2. A process as claimed in claim 1 wherein said subcoating is an emulsion polymer of
    (a) 90–98% of at least one ester of an ethylenically unsaturated acid having 3–5 carbon atoms and an alcohol having 1–4 carbon atoms and
    (b) 2 to 10% by weight of at least one N-alkylolamide of a copolymerizable ethylenically unsaturated acid having 3 to 5 carbon atoms.

3. A process as claimed in claim 1 wherein said subcoating is an emulsion polymer of
    (a) 90–98% of at least one ester of an ethylenically unsaturated carboxylic acid having 3–5 carbon atoms and an alcohol having 1–4 carbon atoms plus at least one copolymerizable ethylenically unsaturated monomer selected from the group consisting of ethylenically unsaturated nitriles having 3–5 carbon atoms, ethylenically unsaturated carboxylic acids having 3–5 carbon atoms, amides of said carboxylic acids, styrene, vinyl chloride, vinylidene chloride, vinyl esters of saturated monocarboxylic acids having 1–18 carbon atoms, and
    (b) 2 to 10% by weight of at least one N-alkylolamide of a copolymerizable ethylenically unsaturated acid having 3 to 5 carbon atoms.

4. A process as claimed in claim 1 wherein 0.5 to 10%, based on the weight of said emulsion polymer, of an acidic curing agent is added to said emulsion polymer, and drying the subcoating at a temperature below 110° C.

5. An article having a polyolefin surface on which is applied directly a subcoating of an emulsion polymer of
    (a) 90–98% by weight of a member selected from the group consisting of (1) at least one ester of an ethylenically unsaturated carboxylic acid having 3–5 carbon atoms and an alcohol having 1–8 carbon atoms and (2) at least one of said esters plus at least one other copolymerizable ethylenically unsaturated monomer selected from the group consisting of ethylenically unsaturated nitriles having 3–5 carbon atoms, ethylenically unsaturated carboxylic acids having 3–5 carbon atoms, amides of said carboxylic acids, styrene, vinyl chloride, vinylidene chloride, vinyl esters of saturated monocarboxylic acids having 1–18 carbon atoms, and
    (b) 2 to 10% by weight of at least one N-alkylolamide of a copolymerizable ethylenically unsaturated acid having 3 to 5 carbon atoms.

6. An article as claimed in claim 5 wherein said subcoating is an emulsion polymer of
    (a) 90–98% of at least one ester of an ethylenically unsaturated acid having 3–5 carbon atoms and an alcohol having 1–4 carbon atoms and
    (b) 2 to 10% by weight of at least one N-alkylolamide of a copolymerizable ethylenically unsaturated acid having 3 to 5 carbon atoms.

7. An article as claimed in claim 5 wherein said subcoating is an emulsion polymer of
    (a) 90–98% of at least one ester of an ethylenically unsaturated carboxylic acid having 3–5 carbon atoms and an alcohol having 1–4 carbon atoms plus at least one copolymerizable ethylenically unsaturated monomer selected from the group consisting of ethylenically unsaturated nitriles having 3–5 carbon atoms, ethylenically unsaturated carboxylic acids having 3–5 carbon atoms, amides of said carboxylic acids, styrene, vinyl chloride, vinylidene chloride, vinyl esters of saturated monocarboxylic acids having 1–18 carbon atoms, and
    (b) 2 to 10% by weight of at least one N-alkylolamide of a copolymerizable ethylenically unsaturated acid having 3 to 5 carbon atoms.

References Cited by the Examiner
UNITED STATES PATENTS

| | | | |
|---|---|---|---|
| 2,808,383 | 10/1957 | Finkentscher et al. | |
| 2,824,024 | 2/1958 | Chapman | 117—138.8 |
| 2,829,068 | 4/1958 | Stewart. | |
| 3,111,418 | 11/1963 | Gilbert et al. | 117—47 |
| 3,117,108 | 1/1964 | Calvete | 260—86.1 |

ALFRED L. LEAVITT, *Primary Examiner.*

RICHARD D. NEVIUS, A. H. ROSENSTEIN,
*Assistant Examiners.*